April 5, 1960
J. W. HOLLAND ET AL
2,931,852
CONDUCTOR BEAD INSULATION ELEMENTS
Filed March 18, 1957
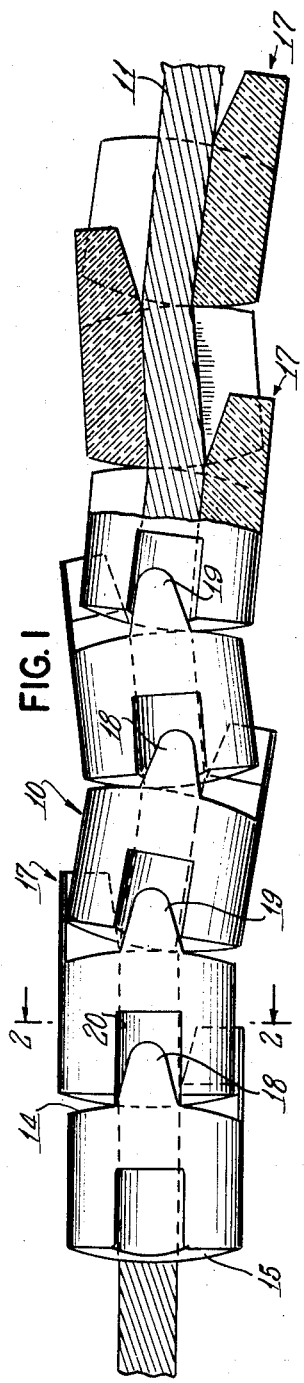
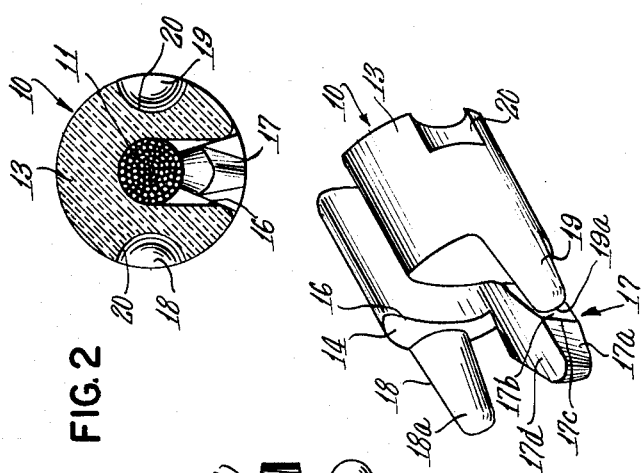
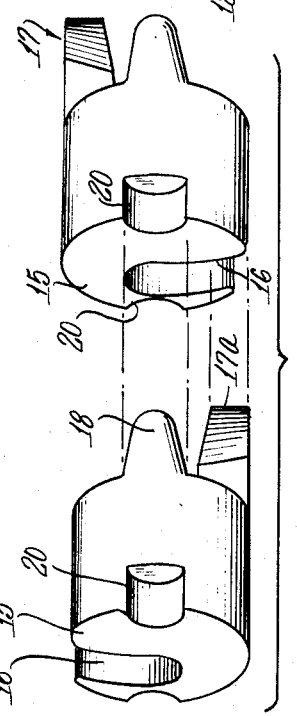
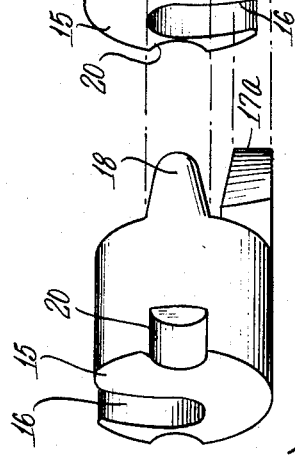
INVENTOR.
John W. Holland
William L. Greyson
BY
ATTORNEYS

United States Patent Office 2,931,852
Patented Apr. 5, 1960

2,931,852

CONDUCTOR BEAD INSULATION ELEMENTS

John W. Holland, East Northport, and William L. Greyson, Halesite, N.Y., assignors to Hitemp Wires, Inc., Mineola, N.Y., a corporation of New York Application March 18, 1957, Serial No. 646,595

1 Claim. (Cl. 174—111)

This invention relates to insulating elements which are capable of being mounted seriatim on a flexible member, such as a wire, a conductor or a cable, without necessitating that they be strung on the flexible member from one end thereof.

Under certain conditions, conventional types of continuous insulating sheathing formed on flexible conductors are unsuitable. For example, it has been found desirable to use a ceramic insulation in certain cases for conductors which are subjected to extreme heat, moisture or radioactivity. Since such ceramic insulation is not flexible, it has been found necessary to string individual ceramic beads, one by one, on the wire from one end. Obviously, this is a very tedious and time-consuming procedure, particularly if the wire is of considerable length.

The object of the present invention is to provide an insulating element capable of being readily mounted with others seriatim on a flexible member without necessitating the stringing of the elements thereon from the extreme end thereof.

Another object of the present invention is to provide an insulating element capable of being mounted with others seriatim on a flexible member wherein the opposing surfaces of adjacent insulating elements are in substantialy rolling contact to afford greater flexibility to the flexible member to be insulated, while at the same time the said opposing surfaces are fitted together in interlocking engagement in order to prevent relative rotation therebetween about the flexible member.

The foregoing and other objects are achieved in the insulation element of the present invention by providing an insulating element with an open slot therein which makes it possible to apply the element on the flexible member between the ends thereof. In addition, at least one end of the element is convexly curved or rounded so as to offer a rocking or rolling contact with the surface of an adjacent element. Also, in a particular embodiment of the invention, it may be desirable to provide means for fitting adjacent elements together in such fashion that they are oriented out of alignment with each other.

In the preferred form of the invention, the insulation element is formed with a tongue projecting from at least one end of the element which is adapted to be inserted in one end of the slot of the adjacent element. Thus, the open slot of one insulating element is closed, at least in part, by the tongue projecting from an adjacent insulating element. The relationship between the slot and the tongue formed on each insulating element insures that the open ends of the slots of adjacent elements will be oriented out of alignment with each other, thereby holding the pair of elements on the flexible member without danger of falling off. More specifically, the engagement of the tongue of one insulating element with the end of the slot of an adjacent insulating element produces an interlocking action between them which prevents the insulating elements from being rotated on the flexible member relative to each other so as to prevent alignment between their respective slots. In addition, the opposed surfaces of adjacent insulating elements are provided with supplementary reinforcing interlocking means which prevents relative rotation between the insulating elements without interfering with the rolling contact between the opposed surfaces.

For a complete understanding of the present invention, reference may be made to the detailed description which follows and to the accompanying drawing in which:

Figure 1 is a view, partly in section, showing a plurality of interlocking insulating elements of the present invention mounted seriatim on a flexible member;

Figure 2 is a cross-section view taken through one of the insulating elements on the plane 2—2 of Figure 1, looking in the direction of the arrows;

Figure 3 is a perspective view of one of the insulating elements; and

Figure 4 is an exploded isometric view showing the orientation between adjacent insulating elements.

Referring to Figure 1 of the drawings, a plurality of identical insulating elements 10 made of ceramic or other inflexible material are mounted side by side seriatim on a flexible member 11, such as a wire, a cable or a conductor. The insulating elements each comprise a cylindrical body 13 having convexly rounded surfaces 14 and 15 at opposite ends of the body 13. In the embodiment illustrated in the drawings, an open slot 16 is formed radially in the outer periphery of the body 13, and the slot extends through the body in an axial direction from one end of the body to the other. The depth of the slot from the outer periphery of the cylindrical body extends beyond the axis of the body so that the insulating element is capable of being mounted on the flexible member coaxially therewith. It is not essential, however, that the slot be formed radially, so that a non-radial or curved slot may be substituted as long as the slot is open to facilitate mounting of the insulation element on the flexible member.

A tongue 17 projects from the end 14 of the cylindrical body in a direction substantially axially of the body and, as viewed from the end 14 of the insulating element, the tongue is diametrically opposite the open end of the slot 16.

The elements are mounted upon the flexible member 11 by aligning the open slot with the flexible member and moving the insulating element relative to the flexible member until the end or bottom of the slot comes into engagement with the flexible member and the side walls defining the slot are straddling the flexible member. An adjacent insulating element is placed on the flexible member in similar fashion, but it is oriented 180° relative to the first insulating element, as shown in Figure 4, so that the projecting tongue can be inserted axially into the open slot from one side thereof. The engagement of the tongue of one insulating element with the slot of an adjacent insulating element prevents relative rotation between adjacent insulating elements about the flexible member 11 and insures that the open slots of each of the members remain out of alignment; in fact, it insures that they remain 180° out of alignment. When a pair of elements are mounted on the flexible member 11 in this fashion, that is to say, with their open slots out of alignment, it will be impossible for a given insulating element to drop off the flexible member unless it becomes disengaged and separated from the adjacent insulating elements. When an entire series of these insulating elements are mounted seriatim in face to face contact on the flexible member 11, they will provide a continuous insulating sheath for the member as long as they are not permitted to be displaced from each other axially. Accordingly, suitable means, such as a bead or a washer, may be clamped on the flexible member outboard of the end insulating elements to insure surface to surface contact between the convexly rounded surfaces 14 and 15 of adjacent insulating elements and to prevent axial separation therebetween. This continuous sheath, even though it be formed of a series of insulation elements made of inflexible material, will nevertheless permit deflection or bending of the flexible member 11 due to the rolling contact between convexly rounded surfaces 14 and 15.

Although the interlocking action of a single tongue 17 of one insulating element with the slot 16 of an adjacent element may be sufficient to prevent relative rotation between adjacent elements, supplemental interengaging means are also provided for this purpose. Accordingly, prongs 18 and 19 are formed integrally with the body 13, projecting outwardly from the surface 14. In addition, two axial grooves 20 are formed in the outer periphery of the cylindrical body 13, the open ends of which form recesses in the surface 15 of the cylindrical body 13. These recesses, like the prongs 18 and 19, are spaced apart on opposite sides of the slot 16, and they are so arranged in relation to the prongs 18 and 19 that the prongs are received within the recesses 20 when the faces 14 and 15 of adjacent insulation elements are brought into face to face contact in proper orientation.

In the case of the prongs 18 and 19, it should be noted that the inner surfaces 18a and 19a thereof, respectively, taper outwardly toward the outer periphery of the prongs 18 and 19 in the direction of the extreme ends thereof. The outer periphery of the prongs is, as shown, continuous with the outer periphery of the body portion 13 of the insulating element. This outward taper of the prongs affords increasing clearance between the surfaces defining the recesses 20 and the surfaces 18a and 19a between the surface 14 and the extreme ends of the prongs 18 and 19, thereby preventing the prongs from impeding the rocking action between the surfaces 14 and 15 when the flexible member is deflected or bent.

It may be noted by reference to Figure 3 that the side edges of the tongue 17 comprise surfaces 17a and 17b which taper in opposite directions. The surfaces or edges 17a taper toward each other at the extreme end or tip of the tongue 17 to afford greater clearance between the edges 17a and the surfaces defining the side walls of the slot 16 so that relative rocking movement between adjacent insulation elements will not be impeded. The surfaces 17b taper slightly toward each other at the opposite end of the tongue, i.e., the end nearest the surface 14 of the body 13, so that the distance between the edges 17c defines the widest portion of the tongue. Thus, even though the edges 17c may be in contact with the walls defining the slot 16 (as shown in Figure 2), the tongue is still permitted substantially universal movement within the slot. The inner surface 17d of the tongue is continuous with the base of the slot 16, sloping away from the axis of the body 13 toward the tip of the tongue.

The invention has been shown in a single preferred form and by way of example only, and obviously many variations and modifications may be made therein without departing from the spirit of the invention. For example, the insulating device may be made with tongues of shorter length than the tongues 17 protruding from both ends of the cylindrical body 13. Also, it may be found feasible to eliminate one or both of the prongs 18 and 19, or to interchange one of the prongs 18 and 19 with one of the recesses 20. It is understood, therefore, that the invention is not to be limited to any specified form or embodiment, except in so far as such limitations are set forth in the appended claim.

We claim:

An insulating element adapted to be mounted with other identical insulation elements seriatim on a flexible wire to be insulated comprising a cylindrical body having convexly rounded surfaces forming both ends of the body, an open slot formed radially in the outer periphery of the body and extending in an axial direction from one end of the body to the other, the depth of said slot extending beyond the axis of the body so as to permit the body to be mounted on the flexible wire coaxially therewith, a tongue projecting from at least one end of the cylindrical body offset from the axis of the body and opposite the open end of the slot, an auxiliary rotation-resisting reinforcing prong projecting from at least one end of the cylindrical body, and means forming a recess in the end of the cylindrical body opposite the rotation-resisting reinforcing prong to receive the rotation-resisting reinforcing prong therein of an adjacent identical element, the tongue of one element being receivable within the end of the slot of an adjacent identical element and the rotation-resisting reinforcing prong being receivable within the recess of an adjacent identical element when adjacent identical elements are mounted on the flexible member in differently oriented positions, the coaction of the tongue and slot and the coaction of the rotation-resisting reinforcing prong and the recess permitting limited universal rolling contact between the opposed convexly rounded surfaces of the adjacent elements, but preventing relative rotation therebetween.

References Cited in the file of this patent

UNITED STATES PATENTS

| 170,024 | Seabury | Nov. 16, 1875 |
| 459,385 | Libbey | Sept. 8, 1891 |
| 470,883 | Vanstone | Mar. 15, 1892 |

FOREIGN PATENTS

| 218,746 | Switzerland | Apr. 16, 1942 |